(12) United States Patent
Setterdahl

(10) Patent No.: US 12,543,616 B2
(45) Date of Patent: Feb. 10, 2026

(54) WEIGHT TRANSFERRING HITCH SYSTEM FOR AGRICULTURAL IMPLEMENT

(71) Applicant: CNH Industrial America LLC, New Holland, PA (US)

(72) Inventor: Sven Nathaniel Setterdahl, Maquon, IL (US)

(73) Assignee: CNH Industrial America LLC, New Holland, PA (US)

( * ) Notice: Subject to any disclaimer, the term of this patent is extended or adjusted under 35 U.S.C. 154(b) by 585 days.

(21) Appl. No.: 18/076,851

(22) Filed: Dec. 7, 2022

(65) Prior Publication Data

US 2024/0188473 A1 Jun. 13, 2024

(51) Int. Cl.
| A01B 63/14 | (2006.01) |
| A01B 35/16 | (2006.01) |
| A01B 59/042 | (2006.01) |
| A01B 79/00 | (2006.01) |

(52) U.S. Cl.
CPC ............ *A01B 63/145* (2013.01); *A01B 35/16* (2013.01); *A01B 59/042* (2013.01); *A01B 79/005* (2013.01)

(58) Field of Classification Search
None
See application file for complete search history.

(56) References Cited

U.S. PATENT DOCUMENTS

| 2,396,576 | A | 3/1946 | Kelly |
| 3,191,963 | A | 6/1965 | Prichard |
| 3,463,511 | A | 8/1969 | Murphy et al. |
| 3,867,992 | A | 2/1975 | Waterman |
| 4,858,698 | A | 8/1989 | Williamson et al. |
| 5,363,924 | A | 11/1994 | Foley et al. |
| 6,196,327 | B1 | 3/2001 | Patel et al. |
| 6,533,307 | B1 | 3/2003 | Singh |
| 6,749,035 | B2 | 6/2004 | Bundy |
| 8,352,121 | B2 | 1/2013 | Bitter |
| 9,095,089 | B2 | 8/2015 | Pichlmaier |
| 9,131,637 | B2 | 9/2015 | Singh |
| 9,686,902 | B2 | 6/2017 | Thomson |
| 9,883,623 | B2 | 2/2018 | Koch et al. |
| 10,021,822 | B2 | 7/2018 | Totten et al. |
| 2015/0289436 | A1 | 10/2015 | Singh |
| 2016/0303933 | A1 | 10/2016 | Nowakowski |
| 2020/0214190 | A1* | 7/2020 | Poulard ................. A01B 63/32 |
| 2020/0337205 | A1* | 10/2020 | Maro ..................... A01C 7/203 |

FOREIGN PATENT DOCUMENTS

WO 2018205000 11/2018

* cited by examiner

Primary Examiner — Christopher J Sebesta
Assistant Examiner — Alfred H Tsui
(74) Attorney, Agent, or Firm — Fletcher Yoder, P.C.

(57) ABSTRACT

An agricultural implement includes a main frame. The agricultural implement also includes at least one disc gang including a plurality of disc blades, wherein the at least one disc gang is coupled to the main frame. The agricultural implement further includes a hitch system coupled to the main frame, wherein the hitch system is configured to couple the agricultural implement to a work vehicle and to transfer weight between the work vehicle and the agricultural implement to adjust a downward force applied on each disc blade of the plurality of disc blades in engaging soil.

16 Claims, 4 Drawing Sheets

WEIGHT TRANSFERRING HITCH SYSTEM FOR AGRICULTURAL IMPLEMENT

BACKGROUND OF THE INVENTION

The present disclosure relates generally to a weight transferring hitch system for an agricultural implement.

Certain agricultural implements include ground engaging tools configured to interact with soil. For example, a tillage implement may include tillage points and/or disc blades configured to break up the soil for subsequent planting or seeding operations. In certain tillage implements, the disc blades are arranged in rows or gangs of disc blades that are pulled through the soil at various depths to break up clods or lumps of soil, as well as old plant material to provide a more amenable soil structure for planting and to level the soil surface. These agricultural implements depend on the static mass of the implement to provide enough weight to allow the tillage discs to penetrate the ground. As speeds and sizes of the machines increase so does the need for more weight per blade for proper ground engagement. In some cases, less weight per blade is necessary for the tillage operation than the total weight of the implement and this weight is carried by the transport wheels of the implement during the tillage operations. To adjust the weight per blades, some implements utilize ballasts that are coupled to the implement frame to increase the available mass to add downward force to the disc cutting blades. The ballasts may be temporarily or permanently coupled to the implement frame.

SUMMARY OF THE INVENTION

Certain embodiments commensurate in scope with the originally claimed subject matter are summarized below. These embodiments are not intended to limit the scope of the claimed subject matter, but rather these embodiments are intended only to provide a brief summary of possible forms of the disclosure. Indeed, the disclosure may encompass a variety of forms that may be similar to or different from the embodiments set forth below.

In certain embodiments, an agricultural implement is provided. The agricultural implement includes a main frame. The agricultural implement also includes at least one disc gang including a plurality of disc blades, wherein the at least one disc gang is coupled to the main frame. The agricultural implement further includes a hitch system coupled to the main frame, wherein the hitch system is configured to couple the agricultural implement to a work vehicle and to transfer weight between the work vehicle and the agricultural implement to adjust a downward force applied on each disc blade of the plurality of disc blades in engaging soil.

In certain embodiments, a weight transferring hitch system for an agricultural implement is provided. The weight transferring hitch system includes an interface portion configured to rigidly mount the agricultural implement to the work vehicle. The weight transferring hitch system also includes a hydraulic cylinder coupled to the interface portion and configured to couple to a main frame of the agricultural implement, wherein the weight transferring hitch system is configured to transfer weight between the work vehicle and the agricultural implement to adjust a downward force applied on each disc blade of a plurality of disc blades in engaging soil, the plurality of disc blades being coupled to the main frame of the agricultural implement.

In certain embodiments, a method for transferring weight between a work vehicle and an agricultural implement utilizing a hitch system of the agricultural implement is provided. The method includes adjusting, via a hydraulic cylinder of the hitch system, a pressure applied to an interface portion of the hitch system rigidly mounting the agricultural implement to the work vehicle, wherein the hydraulic cylinder and the interface portion are coupled to a main frame of the agricultural implement. The method also includes in response to the pressure applied, transferring weight between the work vehicle and the agricultural implement to adjust a downward force applied on each disc blade of the plurality of disc blades in engaging soil, the plurality of disc blades being coupled to the agricultural implement.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

The present disclosure is generally directed to a weight transferring hitch system of an agricultural implement (e.g., tillage implement). The weight transferring hitch system is coupled to a main frame of the agricultural implement and is configured to transfer weight between a work vehicle (e.g., tractor) and the agricultural implement to adjust a downward force applied on each disc blade of the plurality of disc blades (e.g., of a disc gang coupled to the main frame of the agricultural implement) in engaging soil. The weight transferring hitch system includes an interface portion configured to rigidly mount the agricultural implement to the work vehicle. The weight transferring hitch system also includes a hydraulic cylinder coupled to the interface portion and the main frame of the agricultural implement. The hydraulic cylinder is configured to apply pressure to the interface portion to adjust the downward force applied to the main frame and the plurality of disc blades. In certain embodiments, weight is transferred from the work vehicle to the main frame of the implement and the plurality of disc blades to increase the force applied through the discs into the soil. In certain embodiments, static weight (e.g., a percentage of static weight) is transferred from the agricultural implement to the work vehicle to decrease the force applied to the disc blades (as well as the weight on the transport wheels of the agricultural implement) during a tillage operation.

Figure 1:
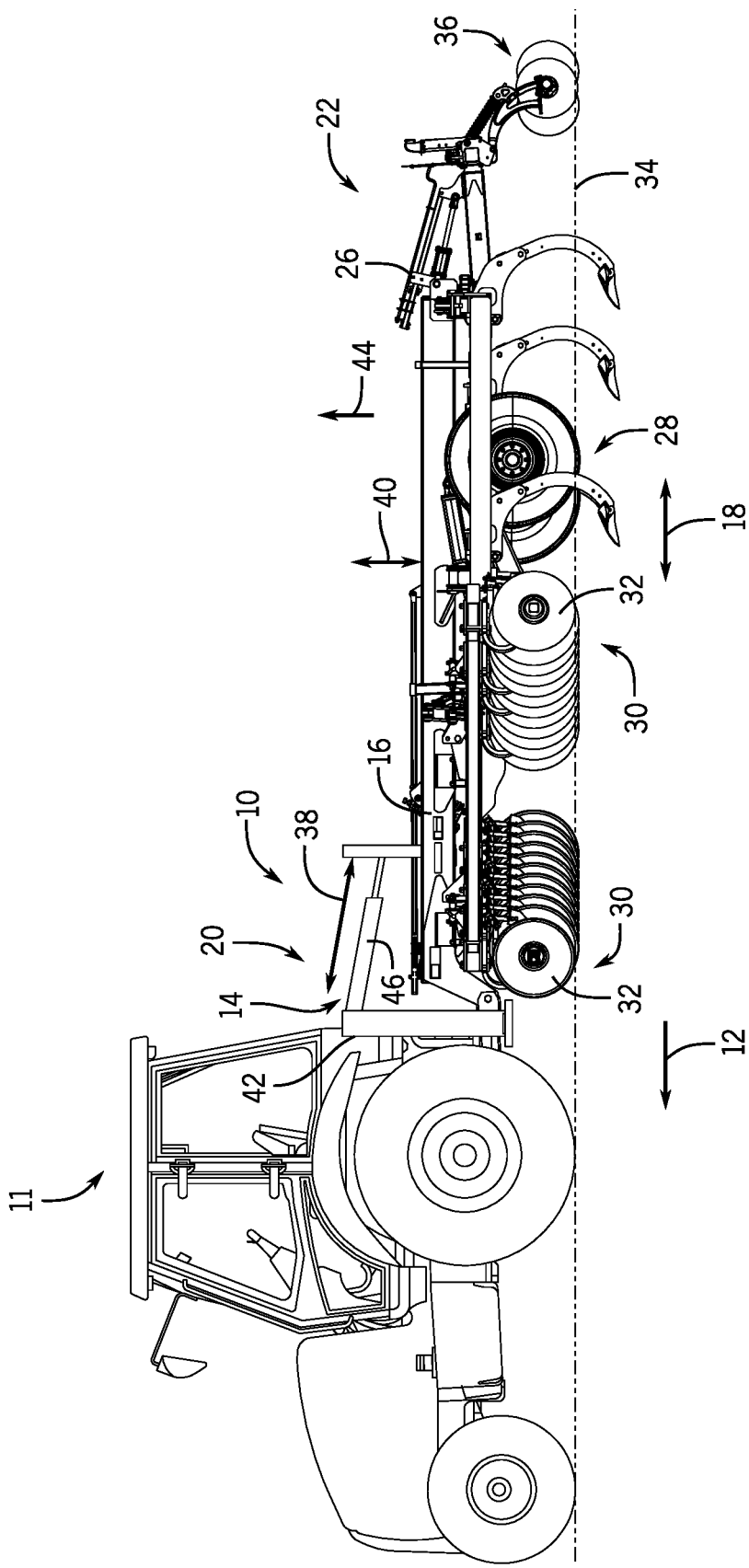
FIG. 1 is a side view of an agricultural implement coupled to a work vehicle, in accordance with aspects of the present disclosure.

Referring now to the drawings, FIG. 1 illustrates a side view of an embodiment of an agricultural implement 10 coupled to a work vehicle 11. In general, the implement 10 may be configured to be towed along a forward direction of travel 12 by a work vehicle 11, such as a tractor or other agricultural work vehicle. For example, the work vehicle 11 may be coupled to the implement 10 via a hitch system or hitch assembly 14 or using any other suitable attachments means. As shown, the hitch system 14 may be coupled to a frame 16 (e.g., main frame) of the implement 10 to facilitate towing the implement 10 in the direction of travel 12.

As shown, the frame 16 may extend in a longitudinal direction (e.g., as indicated by arrow 18 in FIG. 1) between a forward end 20 and an aft or rear end 22. The frame 16 may also extend in a lateral direction between a first side 26 and a second side (not shown). In addition, the frame 16 may generally include a plurality of structural frame members, such as beams, bars, and/or the like, configured to support or couple to a plurality of components.

The implement 10 may further include various wheel assemblies coupled to the frame 16 to support the frame 16 relative to the ground and to facilitate towing the implement 10 in the direction of travel 12. Specifically, in several embodiments, the implement 10 may include a plurality of center support wheel assemblies 28 (e.g., transport wheels) located centrally on the frame 16 between its forward and aft ends 20, 22, with the wheel assemblies 28 being spaced apart from one another in the lateral direction of the implement 10 between its first side 26 and the second side. In certain embodiments, the implement 10 may also include a plurality of forward support wheel assemblies coupled to the frame 16 adjacent to the forward end 20 of the frame 16, with the wheel assemblies being spaced apart from one another in the lateral direction of the implement 10 between its first side 26 and the second side. It should be appreciated that the implement 10 may include any suitable number and/or type of wheel assemblies in alternate embodiments.

Referring still to FIG. 1, the implement 10 may also include a plurality of ground-engaging tools supported by the frame 16. For example, in several embodiments, the frame 16 may be configured to support one or more gangs or sets 30 of disc blades 32 adjacent its forward end or portion 20 and adjacent its aft end or portion 22 configured to till the soil 34. In such embodiments, each disc blade 32 may, for example, include both a concave side (not shown) and a convex side (not shown). Furthermore, the gangs 30 of disc blades 32 may be oriented at an angle relative to the travel direction 12 to promote more effective tilling of the soil 34. Additionally, as shown, in one embodiment, the implement 10 may also include one or more finishing assemblies 36, wherein the frame 16 may be configured to support the finishing assemblies 36 adjacent to its aft end 20 configured to reduce the number of clods in the soil 34 and/or firm the soil 34 over which the implement 10 travels.

Figure 2:
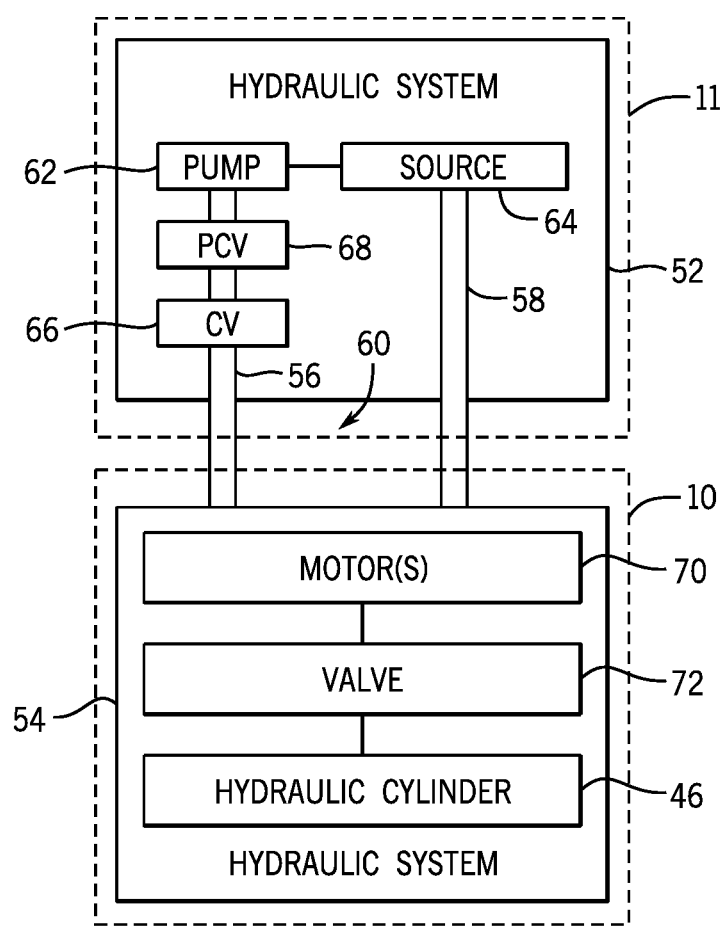
FIG. 2 is a schematic view of a work vehicle coupled to an implement and associated hydraulic systems (e.g., utilizing a mechanical valve for regulating a hitch system), in accordance with aspects of the present disclosure.

It should be appreciated that, in addition to the gangs 30 of disc blades 32 and the finishing assemblies 36 shown in FIGS. 1 and 2, the implement 10 may include any other suitable ground-engaging tools. For instance, if the implement 10 is configured as a cultivator or ripper, the implement 10 may include a plurality of shanks, harrow tines, leveling blades, and/or the like.

The hitch system 14 is a weight transferring hitch system. In particular, the hitch system 14 is configured to be coupled to the frame 16 of the agricultural implement 10 and is configured to transfer weight (as indicated by arrow 38) between the work vehicle 11 (e.g., tractor) and the agricultural implement 10 to adjust a downward force 40 applied on each disc blade 32 of the plurality of disc blades 32 (e.g., of one or more disc gangs 30 coupled to the main frame 16 of the agricultural implement 10) in engaging the soil 34. In certain embodiments, weight is transferred from the work vehicle 11 to the main frame 16 of the implement 10 and the plurality of disc blades 32 to increase the force applied through the disc blades 32 into the soil 34. In certain embodiments, static weight (e.g., a percentage of static weight) is transferred from the agricultural implement 10 to the work vehicle 11 to decrease the force applied to the disc blades 32 (as well as the weight on the transport wheels 28 of the agricultural implement) during a tillage operation.

The weight transferring hitch system 14 includes an interface portion 42 (e.g., rigid structure such as bar or post) on the frame 16 that is configured to be rigidly mounted or attached the agricultural implement 10 to the work vehicle 11 (e.g., hitch (e.g., three-point hitch) or hitch replacement of the work vehicle 11). As depicted, the interface portion 42 extends in a vertical direction 44.

The weight transferring hitch system 14 also includes a hydraulic cylinder 46 coupled to the interface portion 42 and the main frame 16 of the agricultural implement 10. The hydraulic cylinder 46 is configured to apply pressure to the interface portion 42 to adjust the downward force 40 applied to the main frame 16 and the plurality of disc blades 32. The hydraulic cylinder 46 includes a rod 48 (e.g., coupled to a piston) and a base 50 (e.g., cylinder head). The base 50 is directly coupled to the interface portion 42 and the rod 48 is coupled to the frame 16. The rod 48 applies pressure to the base 50 to cause the application of downward force 40 (e.g., due to the rigidity or resistance (e.g., immovability) of the interface portion 42) to the frame 16. In certain embodiments, the rod 48 is directly coupled to the interface portion 42 and the base 50 is directly coupled to the frame 16. In certain embodiments, the hydraulic cylinder 46 is a single-acting cylinder. In certain embodiments, the hydraulic cylinder 46 is a double-acting cylinder.

The hydraulic cylinder 46 is coupled (e.g., fluidly coupled) to a hydraulic system located on the implement 10. The weight transferring hitch system 14 may be controlled in a variety of different ways. In certain embodiments, the hydraulic system includes a mechanical valve disposed upstream of the weight transferring hitch system 14 that regulates the hitch system 14. In particular, the mechanical valve is set to a specific pressure and when actuated causes the hitch system 14 to transfer weight between the work vehicle 11 and the agricultural implement 10 to cause a specific downward force to be applied on each disc blade 32.

In certain embodiments, the hydraulic system is coupled to a hydraulic control system located on the work vehicle 11. In response to an operator input received (e.g., via a switch or button or other device) on the work vehicle 11 (e.g., for a selective control valve), the hydraulic control system is configured to control the hitch system 14 to control the transfer of weight between the work vehicle 11 and the agricultural implement 10.

In certain embodiments, the hitch system 14 is fully and autonomously controlled by a hydraulic control system. The hydraulic control system may be coupled to various sensors (e.g., pressure sensors, force sensors, etc.) disposed on the agricultural implement 10. The hydraulic control system may regulate the hitch system (e.g., hydraulic cylinder 46) based on feedback from one or more sensors.

It should be appreciated that the configuration of the implement 10 described above and shown in FIG. 1 is provided only to place the present subject matter in an exemplary field of use. Thus, it should be appreciated that the present subject matter may be readily adaptable to any manner of implement configuration.

FIG. 2 is a schematic view of the work vehicle 11 coupled to the implement 10 (e.g., tillage implement) and associated hydraulic systems 52, 54 (e.g., utilizing a mechanical valve for regulating a hitch system). The work vehicle 11 includes the hydraulic system 52. The hydraulic system 52 provides pressurized hydraulic fluid to the implement hydraulic system 54 (e.g., hydraulic drive system) via a supply line 56 (e.g., high pressure supply line). Hydraulic fluid is returned to the hydraulic system 52 from the implement hydraulic system 54 at a lower pressure via a return line 58 (e.g., a low pressure return line). The supply line 56 and the return line 58 form a main hydraulic circuit 60. In certain embodiments, there may be multiple supply lines 56 and return lines 58 forming multiple hydraulic circuits between the hydraulic system 52 and the implement hydraulic system 54.

The hydraulic system 52 includes a pump 62 located on the work vehicle 11 that is configured receive hydraulic fluid from a fluid source 64 (e.g., tank) and to provide the fluid (e.g., hydraulic fluid) for output via the supply line 56 to the implement hydraulic system 52. The hydraulic system 52 includes a control valve 66 (e.g., flow control valve) in flow communication with the supply line 56. The control valve 66 is configured to regulate the supply of the hydraulic fluid between the pump 62 and the supply line 56. The hydraulic system 52 also includes a pressure control valve 68 fluidly coupled between the pump 62 and the control valve 66. The pressure control valve 68 is in flow communication with the supply line 56. The pressure control valve 68 regulates the pressure of the hydraulic fluid being supplied to the control valve 66 from the pump 62.

The implement hydraulic system 54 includes a plurality of hydraulic motors 70 associated with driving various functions (e.g., fertilizer, vacuum fan, bulk fill fan, alternator, etc.) of the implement 10. These hydraulic motors 70 are coupled to the main hydraulic circuit 60. The hydraulic motors 70 may include an alternator motor, a vacuum motor, bulk fill motor, compressor motor, and fertilizer motor. In certain embodiments, one or more of the hydraulic motors 70 may be coupled to different hydraulic circuits including one coupled to the hydraulic cylinder 46 of the hitch system 14 in FIG. 1. As depicted, the implement hydraulic system 54 includes a mechanical valve disposed upstream of the hydraulic cylinder 46 of the weight transferring hitch system that regulates the hitch system. In particular, the mechanical valve is set to a specific pressure and when actuated causes the hitch system to transfer weight between the work vehicle 11 and the agricultural implement 10 to cause a specific downward force to be applied on each disc blade.

Figure 3:
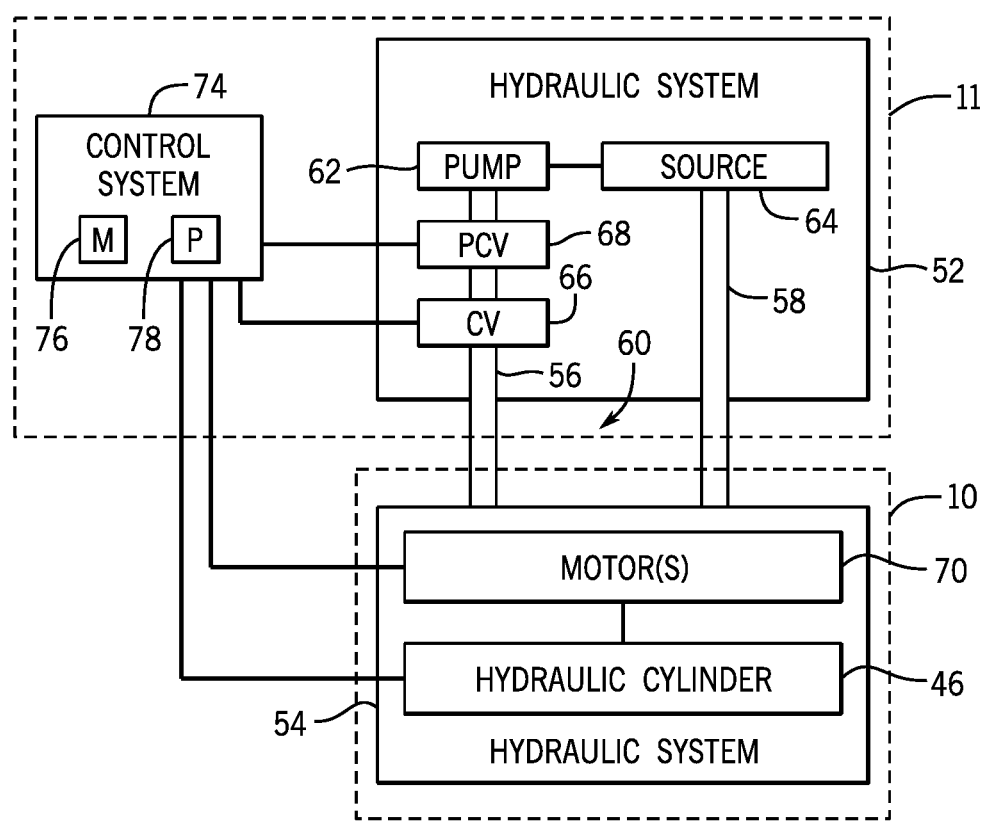
FIG. 3 is a schematic view of a work vehicle coupled to an implement and associated hydraulic systems (e.g., utilizing electromechanical control for regulating a hitch system), in accordance with aspects of the present disclosure.

FIG. 3 is a schematic view of the work vehicle 11 coupled to the implement 10 and associated hydraulic systems 52, 54 (e.g., utilizing electromechanical control for regulating a hitch system). In general, the hydraulic systems 52, 54 are as described in FIG. 2 with a couple of exceptions. The implement hydraulic system 54 lacks a valve (e.g., valve 72 in FIG. 2) set to a specific pressure. Instead, the hydraulic cylinder 46 and, thus, the hitch system is regulated by a hydraulic control system 74 (e.g., controller) located on the work vehicle and coupled to both the hydraulic systems 52, 54. As noted above, in response to an operator input received (e.g., via a switch or button or other device) on the work vehicle 11 (e.g., for a selective control valve), the hydraulic control system 74 is configured to control the hitch system (via the hydraulic cylinder 46) to control the transfer of weight between the work vehicle 11 and the agricultural implement 10.

The hydraulic control system 74 may include a memory 76 and a processor 78. In some embodiments, the processor 78 may include one or more general purpose processors, one or more application specific integrated circuits, one or more field programmable gate arrays, or the like. Additionally, the memory 76 may be any tangible, non-transitory, computer readable medium that is capable of storing instructions executable by the processor 78 and/or data that may be processed by the processor 78. In other words, the memory 76 may include volatile memory, such as random access memory, or non-volatile memory, such as hard disk drives, read only memory, optical disks, flash memory, and the like.

Figure 4:
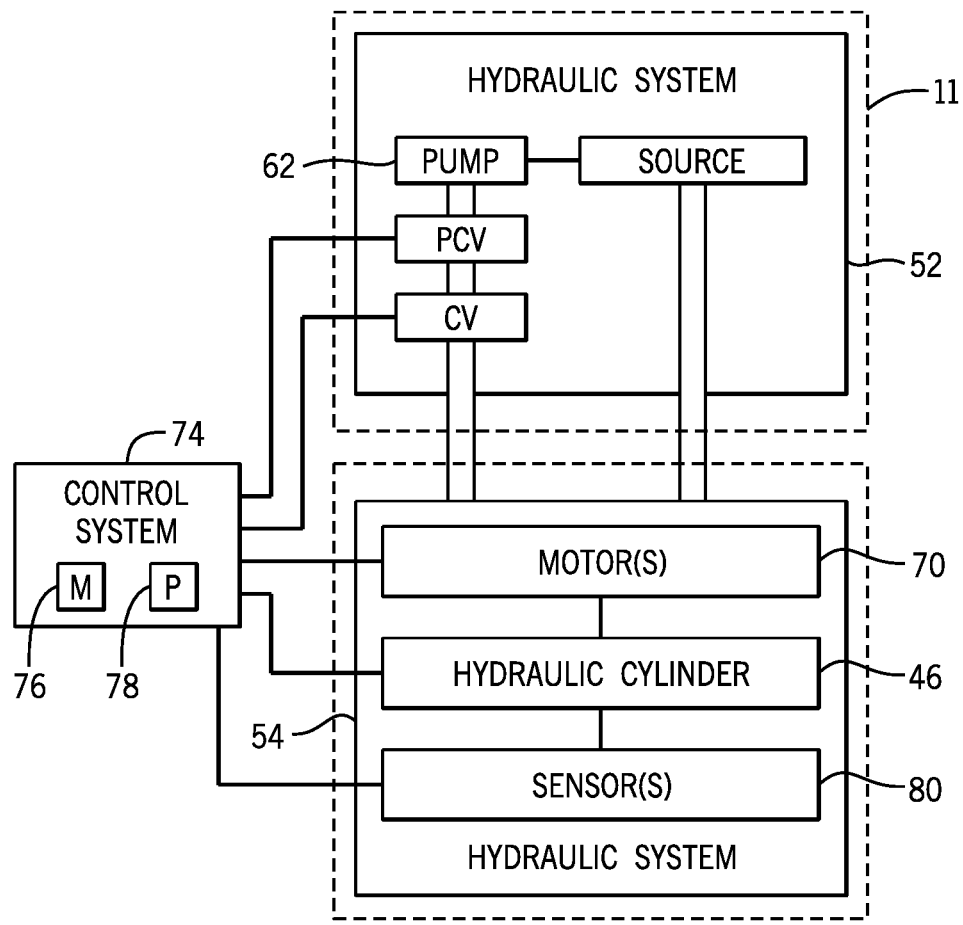
FIG. 4 is a schematic view of a work vehicle coupled to an implement and associated hydraulic systems (e.g., utilizing autonomous control for regulating a hitch system), in accordance with aspects of the present disclosure.

FIG. 4 is a schematic view of the work vehicle 11 coupled to the implement 10 and associated hydraulic systems 52, 54 (e.g., utilizing autonomous control for regulating a hitch system). In general, the hydraulic systems 52, 54 are as described in FIG. 3 with a couple of exceptions. The hydraulic control system 74 may be located on either the work vehicle 11 or the implement 10. In addition, the hydraulic control system 74 is coupled to one or more sensors 80 located on the implement 10. The hydraulic control system 74 is configured to fully and autonomously control the hydraulic cylinder 46 based on feedback from the one or more sensors 80. The one or more sensors 80 may include pressure sensors, force sensors, or types of sensors that may provide feedback related to control of the hitch system and the transferring of weight between the work vehicle 11 and the implement. The sensors 80 may provide feedback on the force asserted on the disc blades and/or the pressure being asserted by hydraulic cylinder 46 as an example.

Figure 5:
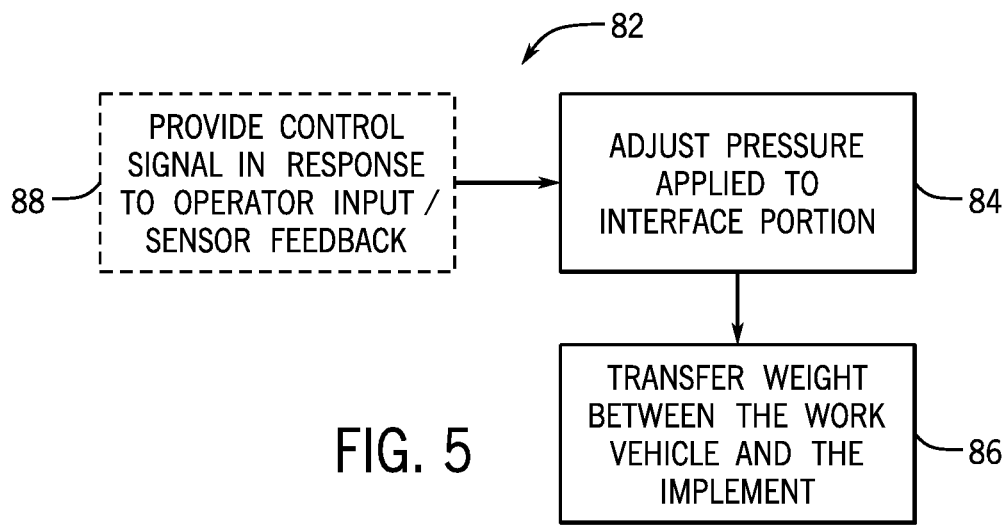
FIG. 5 is a method for altering a position of a disc gang, in accordance with aspects of the present disclosure.

FIG. 5 is a method 82 for transferring weight between a work vehicle and an agricultural implement utilizing a hitch system (e.g., hitch system 14 in FIG. 1) of the agricultural implement. The method 82 includes adjusting, via a hydraulic cylinder of the hitch system, a pressure applied to an interface portion of the hitch system rigidly mounting the agricultural implement to the work vehicle (block 84). The method 82 also includes transferring, in response to the pressure applied, weight between the work vehicle and the agricultural vehicle to adjust a downward force applied on each disc blade of a plurality of disc blades (e.g., one or more gangs of disc blades coupled to the agricultural implement) in engaging the soil (block 86). In certain embodiments, weight is transferred from the work vehicle to the main frame of the implement and the plurality of disc blades to increase the force applied through the disc blades into the soil. In certain embodiments, static weight (e.g., a percentage of static weight) is transferred from the agricultural implement to the tractor to decrease the force applied to the disc blades (as well as the weight on the transport wheels of the agricultural implement) during a tillage operation. In certain embodiments, the method 82 includes providing one or more control signals to the hitch system (e.g., the hydraulic cylinder of the hitch system) based on an operator input or feedback from sensors (e.g., related to related to pressure of the hydraulic cylinder or force applied to the disc blades) located on the agricultural implement (block 88) to cause the adjustment to the pressure applied by the hydraulic cylinder (block 84) and the transfer of weight between the work vehicle and the agricultural implement (block 86).

While only certain features have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for (perform)ing (a function) . . . " or "step for (perform)ing (a function) . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. An agricultural implement, comprising:
a main frame;
at least one disc gang comprising a plurality of disc blades, wherein the at least one disc gang is coupled to the main frame; and
a hitch system coupled to the main frame, wherein the hitch system is configured to couple the agricultural implement to a work vehicle and to transfer weight between the work vehicle and the agricultural implement to adjust a downward force applied on each disc blade of the plurality of disc blades in engaging soil, wherein the hitch system is configured to transfer weight from the work vehicle to the agricultural implement to increase the downward force applied on each disc blade of the plurality of disc blades, and wherein the hitch system comprises an interface portion disposed on the main frame and configured to be rigidly mount the agricultural implement to the work vehicle and a hydraulic cylinder coupled to the interface portion and the main frame, and the interface portion is orientated in a vertical direction relative to a direction of travel.

2. The agricultural implement of claim 1, wherein the hitch system is configured to transfer static weight from the agricultural implement to the work vehicle to decrease the downward force applied on each disc blade of the plurality of disc blades.

3. The agricultural implement of claim 1, wherein the hydraulic cylinder is configured to apply pressure to the interface portion to adjust the downward force applied to the main frame and the plurality of disc blades.

4. The agricultural implement of claim 1, wherein the hydraulic cylinder is a single-acting cylinder.

5. The agricultural implement of claim 1, wherein the hydraulic cylinder is a double-acting cylinder.

6. The agricultural implement of claim 1, comprising a hydraulic system fluidly coupled to the hydraulic cylinder, wherein the hydraulic system comprises a mechanical valve set to a specific pressure that when actuated causes the hitch system to transfer weight between the work vehicle and the agricultural implement to cause a specific downward force to be applied on each disc blade of the plurality of disc blades.

7. The agricultural implement of claim 1, comprising a hydraulic system fluidly coupled to the hydraulic cylinder, wherein a hydraulic control system located on the work vehicle and coupled to the hydraulic system is configured, via an operator input, to control the hitch system to transfer weight between the work vehicle and the agricultural implement.

8. The agricultural implement of claim 1, comprising a hydraulic system fluidly coupled to the hydraulic cylinder, wherein a hydraulic control system located on the work vehicle and coupled to the hydraulic system is configured to autonomously control the hitch system to transfer weight between the work vehicle and the agricultural implement.

9. The agricultural implement of claim 1, wherein the agricultural implement comprises a tillage implement.

10. A weight transferring hitch system for an agricultural implement, comprising:
an interface portion configured to rigidly mount the agricultural implement to a work vehicle, and the interface portion is orientated in a vertical direction relative to a direction of travel; and
a hydraulic cylinder coupled to the interface portion and configured to couple to a main frame of the agricultural implement, wherein the weight transferring hitch system is configured to transfer weight between the work vehicle and the agricultural implement to adjust a downward force applied on each disc blade of a plurality of disc blades in engaging soil, the plurality of disc blades being coupled to the main frame of the agricultural implement, wherein the weight transferring hitch system is configured to transfer weight from the work vehicle to the agricultural implement to increase the downward force applied on each disc blade of the plurality of disc blades.

11. The weight transferring hitch system of claim 10, wherein the hydraulic cylinder is configured to apply pressure to the interface portion to adjust the downward force applied to the main frame and the plurality of disc blades.

12. The weight transferring hitch system of claim 10, wherein the weight transferring hitch system is configured to transfer static weight from the agricultural implement to the work vehicle to decrease the downward force applied on each disc blade of the plurality of disc blades.

13. The weight transferring hitch system of claim 10, wherein the hydraulic cylinder is a single-acting cylinder.

14. The weight transferring hitch system of claim 10, wherein the hydraulic cylinder is a double-acting cylinder.

15. A method for transferring weight between a work vehicle and an agricultural implement utilizing a hitch system of the agricultural implement, comprising:
adjusting, via a hydraulic cylinder of the hitch system, a pressure applied to an interface portion of the hitch system rigidly mounting the agricultural implement to the work vehicle, wherein the hydraulic cylinder and the interface portion are coupled to a main frame of the agricultural implement, and the interface portion is orientated in a vertical direction relative to a direction of travel; and in response to the pressure applied, transferring weight between the work vehicle and the agricultural implement to adjust a downward force applied on each disc blade of a plurality of disc blades in engaging soil, the plurality of disc blades being coupled to the agricultural implement, wherein transferring weight between the work vehicle and the agricultural implement comprises transferring weight from the work vehicle to the agricultural implement to increase the downward force applied on each disc blade of the plurality of disc blades.

16. The method of claim 15, wherein transferring weight between the work vehicle and the agricultural implement comprises transferring static weight from the agricultural implement to the work vehicle to increase the downward force applied on each disc blade of the plurality of disc blades.

* * * * *